Figure 1:
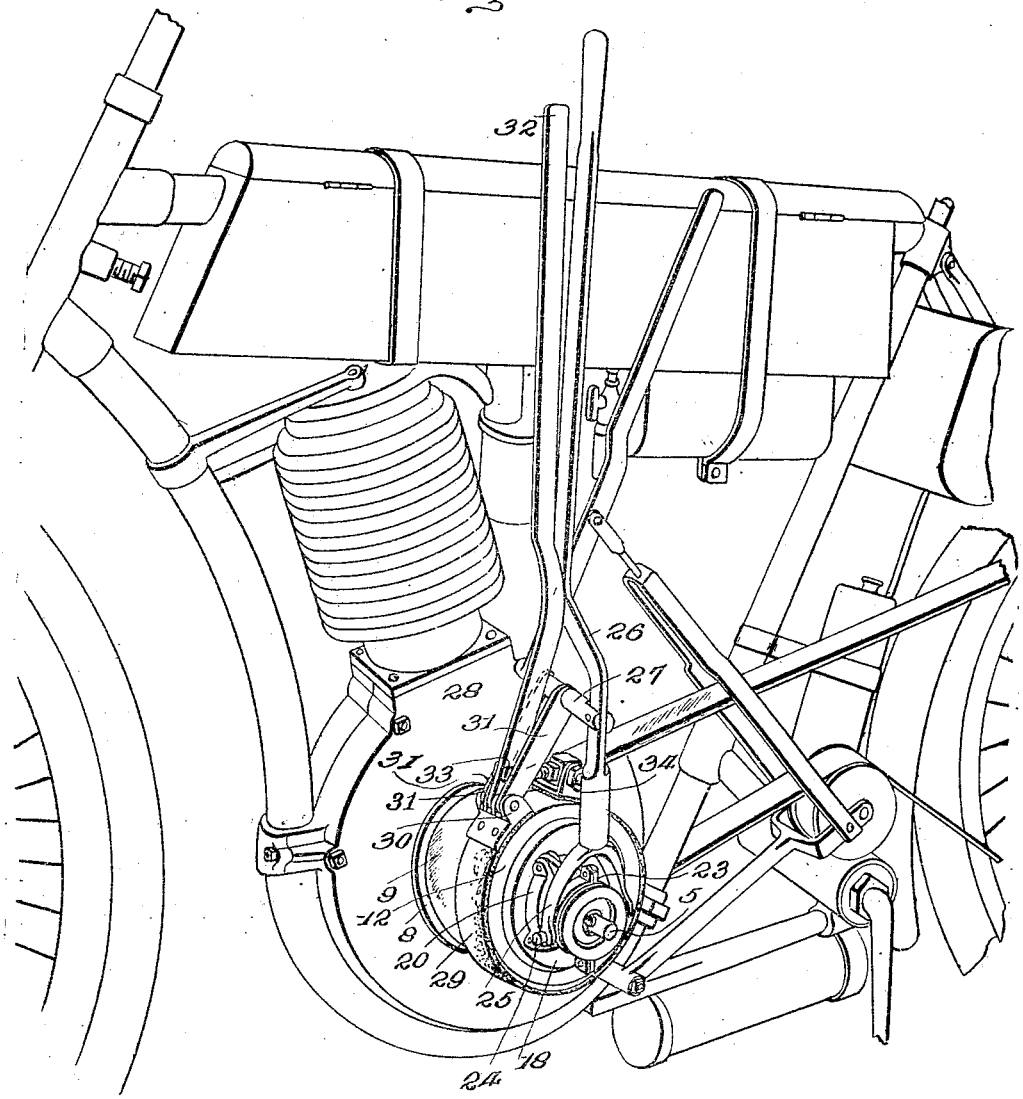

C. H. LANG.
CHANGEABLE SPEED GEARING FOR MOTOR CYCLES.
APPLICATION FILED JAN. 28, 1908.

908,583.

Patented Jan. 5, 1909.

3 SHEETS—SHEET 1.

C. H. LANG.
CHANGEABLE SPEED GEARING FOR MOTOR CYCLES.
APPLICATION FILED JAN. 28, 1908.
908,583.
Patented Jan. 5, 1909.
3 SHEETS—SHEET 2.
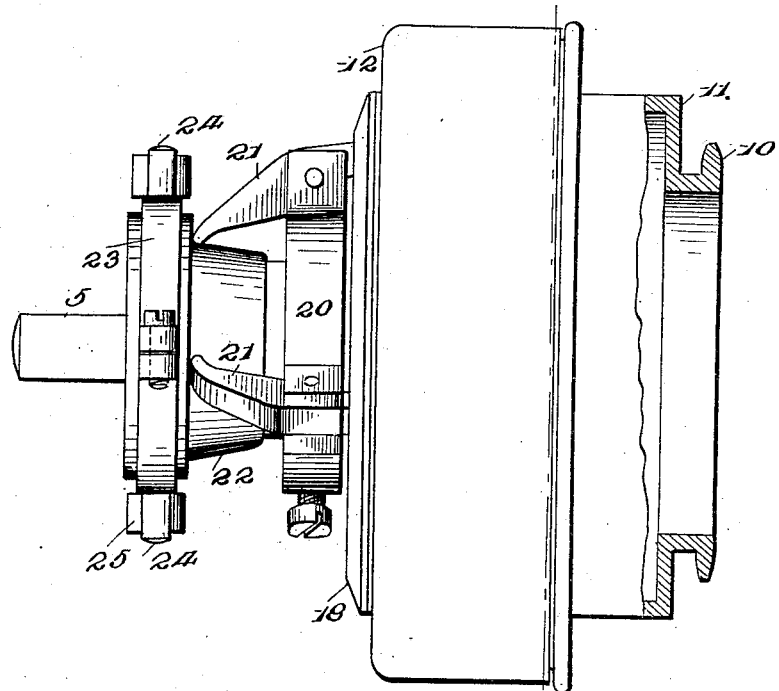
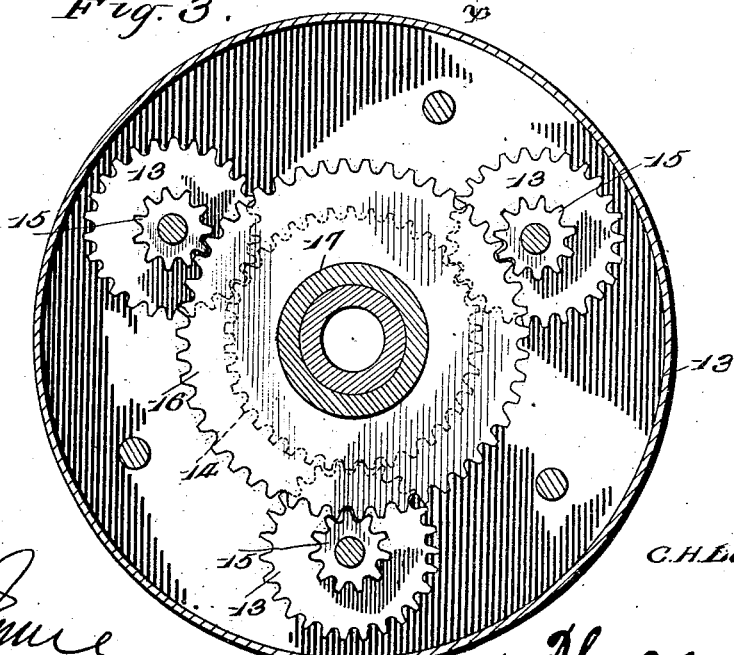

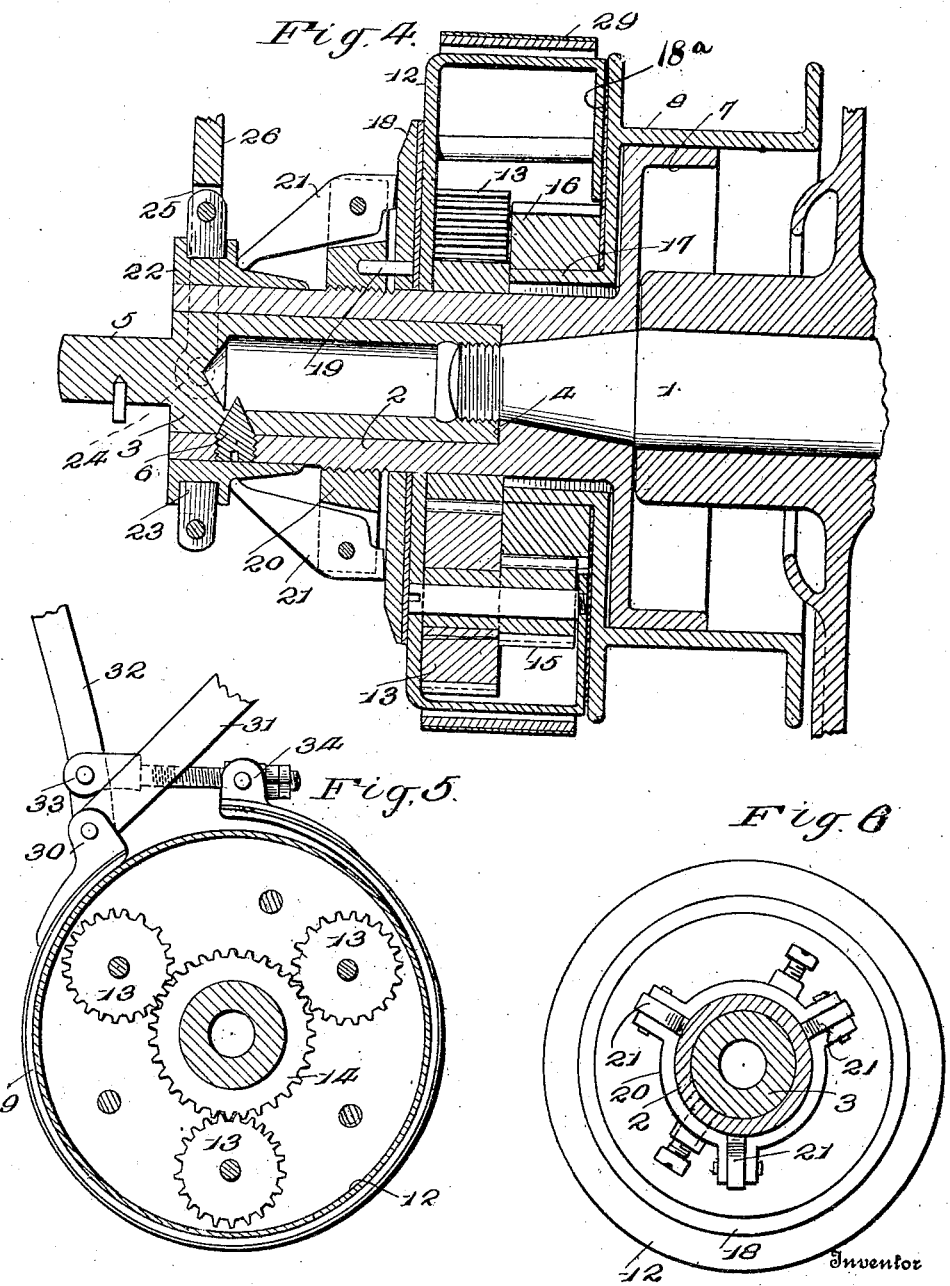

UNITED STATES PATENT OFFICE.

CARL H. LANG, OF CHICAGO, ILLINOIS.

CHANGEABLE-SPEED GEARING FOR MOTOR-CYCLES.

No. 908,583.  Specification of Letters Patent.  Patented Jan. 5, 1909.

Application filed January 28, 1908. Serial No. 413,146.

*To all whom it may concern:*

Be it known that I, CARL H. LANG, citizen of the United States, residing at Chicago, in the county of Cook and State of Illinois, have invented certain new and useful Improvements in Changeable - Speed Gearing for Motor-Cycles, of which the following is a specification.

This invention comprehends certain new and useful improvements in changeable speed gearing, and the invention has for its object a simple, compact and efficient construction of two speed gearings for motor cycles embodied with the pulley or power transmission element of the motor cycle and mounted directly on the shaft of the motor.

The invention consists in certain constructions, arrangements and combinations of the parts that I shall hereinafter fully describe and claim.

For a full understanding of the invention, reference is to be had to the following description and accompanying drawings, in which:

Figure 1 is a perspective view of my improved changeable speed gearing; Fig. 2 is a side elevation thereof; Fig. 3 is a transverse section on the line x—x of Fig. 2; Fig. 4 is a longitudinal section; Fig. 5 is a detail view of the band employed for holding the gear case stationary; and, Fig. 6 is a detail section through a portion of the clutch.

Corresponding and like parts are referred to in the following description and indicated in all the views of the drawings by the same reference characters.

Referring to the drawings, the numeral 1 designates the motor shaft of a motor cycle in which my invention is embodied and 2 the drive element which is in the form of a sleeve adapted to be slipped on the outer end of the shaft 1, being held on said shaft by means of a preferably hollow nut 3 slipped in the outer hollow end of the drive element 2 and screwing on the end of the shaft 1 and bearing against an outwardly facing annular shoulder 4 formed on the interior of the drive element, as clearly illustrated in the drawings. The outer projecting end 5 of the nut 3 forms the crank starting pin for the motor. Preferably a pointed screw 6 is used to hold the nut 3 from unscrewing from the shaft.

The inner end of the drive element 2 surrounds the shaft bearing and is formed with an annular rim 7 upon which the flanged pulley 8 of the motor cycle is mounted for revoluble movement. Around the pulley 8, the driving belt 9 extends in the usual manner. If desired, as illustrated in Fig. 2, I may so construct the pulley that it will be provided with a sprocket wheel 10 secured on a sprocket carrier 11 as shown, so as to adapt the device for motor cycles wherein a chain drive is employed.

Included in the power transmission element of which the pulley 8 forms a part, is a gear case 12 which is mounted at one side of the pulley as shown and which carries a set of relatively large pinions 13 mounted therein. In the present instance there are three of these pinions 13, although, obviously, my invention is not limited to this or any number. The pinions 13 mesh with a spur pinion 14 keyed or otherwise made fast on the sleeve-like portion of the drive element 2. Fast with each of the pinions 13 is a relatively small pinion 15, the said pinions 13 and 15 being preferably solid. The pinions 15 mesh with a relatively large gear wheel 16 keyed or otherwise rigidly secured on an annular boss-like extension 17 formed on the pulley 8 within the circle of the gear case 12.

18 designates a friction disk which is adapted to be pressed frictionally against the outer face of the gear case 12 which is mounted for revoluble movement on the drive element 2. The friction disk 18 is formed with a plurality of apertures which receive guide pins 19 projecting forwardly from a jaw holder 20. This jaw holder is mounted upon the drive element 2, preferably by an adjustable threaded connection and is held securely thereon after the proper adjustment has been effected, by means of set screws or the like. The jaw holder 20 carries a plurality of rocking jaws 21 that are designed to be rocked against the outer face of the friction disk 18 so as to force the latter into frictional engagement with the outer face of the gear case 12. In order to rock the jaws 21, I provide a cone 22 slipped over the outer end of the drive element 2 and shiftable laterally thereon, so as to engage the outer ends of the jaws.

In the practical operation of my improved two-speed gearing and friction clutch for motor cycles, the high speed is obtained by shifting the cone 22 inwardly on the drive element 2 so as to rock the jaws 21 and force the friction disk 18 tightly against the outer face of the gear case 12. The gear case 12 is at this time permitted to turn, and hence the gears 13, 14, 15 and 16 will all be locked together and the gear case 12 and pulley 8 will be turned as an integer, thereby obtaining direct speed from the motor shaft 1. If low speed is desired, it is only necessary to release the clutch disk 18 and to hold the gear case 12 stationary, as by means hereinafter described, whereupon it is evident that the rotation of the shaft 1 and gear 14 will impart a rotation to the gears 13 and this motion will be transmitted to the relatively small pinions 15 and thence to the gear wheel 16 fast on the boss 17 of the pulley 8, so as to turn the latter at a reduced speed. By releasing the clutch disk 18, as well as the gear case 12, it is clear that the engine shaft may run free.

In order to manipulate the parts for the operation above described, I provide in the present instance a shifter ring 23 mounted to rotate within an annular groove on the outer end of the cone 22. This shifter ring is provided with diametrically opposite pins 24 on which the forked lower end 25 on the shipper lever 26 is mounted. This shipper lever is fulcrumed intermediate of its ends on a rod 27 projecting outwardly in a horizontal direction and secured to the gear case 28 of the motor, as clearly illustrated in the drawings, and the handle or upper end of the said lever extends in convenient relation to the rider's seat or saddle.

In order to hold the gear case 12 stationary for the reduced speed, as above described, said case is encircled by a metal-sheathed band 29. This band is provided at one end with spaced ears 30 through which a pin extends and pivotally connected thereto are spaced links 31, said links being apertured at their opposite ends as shown, and slipped over and held upon the rod 27. The pin that is passed through the ears 30 also serves to fulcrum the lower end of a hand lever 32 between said ears, said lever being connected above its fulcrum by a relatively short link 33 to the opposite end of the band 29. By this means, it is clear that when the hand lever 32 is in a substantially vertical position, the band will be loose upon the gear case 12 and when the hand lever is thrust forwardly and downwardly, it will draw the band tightly around the gear case and hold the same stationary so as to bring into play the speed reducing effect of the gear elements 13, 14, 15 and 16.

From the foregoing description in connection with the accompanying drawings, it will be seen that I have provided a very simple, durable and compact construction of two-speed gear with friction clutch for motor cycles, all of the main parts of which are contained in the pulley of the cycle and mounted on and supported by the outer end of the shaft thereof. The various arrangements of hand levers and their concomitant parts render the operation of changing the speed, or of permitting the engine to run free, capable of easy accomplishment.

In the accompanying claims, when the term pulley is used, it is to be understood that the term includes power transmission elements susceptible to use with a band or sprocket, or of other driving connections with the rear wheel or other part to be driven.

It will be seen that the clutch of my improvement is a multiple disk clutch, one disk 18 being designed for frictional engagement with the outer face of the gear case 12 and the other disk 18$^a$ being formed by the inwardly extending rim at the inner side of the gear case, designed for frictional engagement with the outer face of the pulley 8.

Having thus described the invention, what is claimed as new is:

1. The combination with a motor shaft, of a drive element mounted thereon, a pulley mounted for revoluble movement on the drive element and provided with a gear wheel, a gear case mounted alongside of said pulley and inclosing said gear wheel, relatively small and large pinions mounted side by side in said case and rigidly connected together, the small pinion meshing with said gear wheel, a pinion fast on the drive element and meshing with the large pinion within the gear case, means for directly connecting the drive element with the gear case and the gear case with the pulley, whereby to lock the pinions together and effect the direct rotation of the pulley, and means for holding the gear case stationary, as and for the purpose set forth.

2. In a motor cycle, the combination with a motor shaft, of a drive element mounted on said shaft, a pulley mounted for revoluble movement on said drive element, a gear wheel fast on said pulley, a gear case mounted alongside of said pulley and arranged for frictional engagement therewith, a relatively small pinion journaled in said case meshing with said gear wheel, a relatively large pinion fast with the small pinion in the case, a pinion fast on the drive element and meshing with said relatively large pinion in the case, a friction disk encircling said drive element at the outer side of the gear case, means for pressing said friction disk against the outer side of the gear case, and means for holding the gear case stationary with the friction disk out of operative engagement therewith.

3. In a motor cycle, the combination with a drive shaft of a motor, of a drive element mounted thereon and embodying an elongated sleeve and an annular rim, a pulley mounted to rotate on said rim, a gear wheel fixed on said pulley and encircling the sleeve portion of the drive element, a gear case mounted to turn on the sleeve portion of the drive element along side of the pulley and arranged for frictional engagement therewith, a pinion mounted in said gear case and meshing with the pinion of the pulley, a relatively large pinion fast with the other pinion in the gear case, another pinion fast on the sleeve portion of the drive element and meshing with said relatively large pinion, a friction disk mounted on said drive element and adapted to be pressed against the outer face of the gear case, means for pressing said friction disk inwardly against the outer face of the gear case and the inner face of the gear case against the pulley, and means for holding the gear case stationary.

4. In a motor cycle, the combination with a motor and its drive shaft of a drive element secured thereto, a pulley mounted for revoluble movement on said drive element, a gear case mounted on said drive element and having a gearing connection therewith and with the pulley, a clutch member mounted on said drive element and arranged for engagement with the gear case, means for actuating the clutch member said means including a shipper lever, a rod secured to and projecting outwardly from the motor, the lever being fulcrumed on said rod, a band encircling said gear case, links connected to one end of said band and suspended from said rod, a lever fulcrumed on said end of the band, and a link connection between said lever and the other end of the band.

In testimony whereof I affix my signature in presence of two witnesses.

CARL H. LANG. [L. S.]

Witnesses:
ELWOOD G. GODMAN,
MARK P. GRINER.